(12) United States Patent
Im et al.

(10) Patent No.: US 12,331,810 B2
(45) Date of Patent: Jun. 17, 2025

(54) SAFETY SHACKLE

(71) Applicants: EASY LOCK CO., LTD., Ansan-si (KR); Yong Tae Im, Gapyeong-gun (KR)

(72) Inventors: Yong Tae Im, Gapyeong-gun (KR); Young Sung Lee, Goseong-gun (KR)

(73) Assignees: EASY LOCK CO., LTD., Ansan-si (KR); Yong Tae IM, Gapyeong-gun (KR)

(*) Notice: Subject to any disclaimer, the term of this patent is extended or adjusted under 35 U.S.C. 154(b) by 0 days.

(21) Appl. No.: 18/020,470

(22) PCT Filed: Nov. 14, 2022

(86) PCT No.: PCT/KR2022/017814
§ 371 (c)(1),
(2) Date: Feb. 9, 2023

(87) PCT Pub. No.: WO2024/010147
PCT Pub. Date: Jan. 11, 2024

(65) Prior Publication Data
US 2024/0263685 A1    Aug. 8, 2024

(30) Foreign Application Priority Data
Jul. 6, 2022    (KR) .................. 10-2022-0083143

(51) Int. Cl.
*F16G 15/06*    (2006.01)
*B66C 1/36*    (2006.01)

(52) U.S. Cl.
CPC ............... *F16G 15/06* (2013.01); *B66C 1/36* (2013.01); *F16B 2200/69* (2023.08)

(58) Field of Classification Search
CPC .......... F16G 15/00; F16G 15/02; F16G 15/04; F16G 15/06; F16G 15/08; F16G 15/10;
(Continued)

(56) References Cited

U.S. PATENT DOCUMENTS 8,104,988 B2    1/2012    Lunn et al.
9,909,440 B2    3/2018    Gupta et al.
(Continued)

FOREIGN PATENT DOCUMENTS

CN    108350987 A    7/2018
CN    112096786 A    12/2020
(Continued)

OTHER PUBLICATIONS

International Search Report issued on Mar. 24, 2023, in counterpart International Patent Application No. PCT/KR2022/017814 (3 pages in Korean).
(Continued)

*Primary Examiner* — Jared O Brown
(74) *Attorney, Agent, or Firm* — NSIP Law

(57) ABSTRACT

A safety shackle comprising a first safety hook mechanism including a pair of first safety hooks having first fixing latches which are inserted into or separated from a locking groove of a first pin end portion positioned in a first through hole of a first body end portion as first hook bodies are coupled to the first body end portion by first hinge shafts and rotated in a state in which the first safety hooks are symmetrical with each other and partially inserted into a first hook mounting hole of the first body end portion, and a first safety hook spring which is disposed between the first safety hooks and applies an elastic force to the first safety hooks in directions in which the first fixing latches are inserted into the locking groove.

8 Claims, 9 Drawing Sheets

(58) Field of Classification Search
CPC ... F16G 17/00; B66C 1/36; Y10T 403/32893; F16B 21/16; F16B 2200/69
USPC .............................. 59/86; 403/154; 278/96
See application file for complete search history.

(56) References Cited

U.S. PATENT DOCUMENTS

| | | |
|---|---|---|
| 10,228,008 B2 | 3/2019 | VerBrugge |
| 2009/0196683 A1* | 8/2009 | Lunn ...................... F16G 15/06 |
| | | 403/154 |
| 2017/0089382 A1* | 3/2017 | VerBrugge .............. F16G 15/06 |
| 2017/0114861 A1* | 4/2017 | Ohman, III ............. F16G 11/00 |

FOREIGN PATENT DOCUMENTS

| | | |
|---|---|---|
| GB | 112371 A * | 1/1918 |
| GB | 2 221 277 A | 1/1990 |
| KR | UM 20-0478395 | 9/2015 |
| KR | 10-1705891 | 2/2017 |
| KR | 10-2051669 B1 | 1/2020 |
| WO | WO 2009/149503 A1 | 12/2009 |
| WO | WO 2016/153196 A1 | 9/2016 |
| WO | WO 2021/194354 A1 | 9/2021 |

OTHER PUBLICATIONS

Australian Office Action issued on Feb. 13, 2025, in corresponding Australian Patent Application No. 2022459561. (7pages in English).
Korean Office Action issued on Oct. 22, 2024 in corresponding Korean Patent Application No. 10-2023-5138823. (2 pages in Korean).

\* cited by examiner

SAFETY SHACKLE

CROSS REFERENCE TO RELATED APPLICATIONS

This application is a U.S. National Stage Application of International Application No. PCT/KR2022/017814, filed on Nov. 14, 2022, which claims the benefit under 35 USC 119(a) and 365(b) of Korean Patent Application No. 10-2022-0083143, filed on Jul. 6, 2022, in the Korean Intellectual Property Office, the entire disclosure of which is incorporated herein by reference for all purposes.

TECHNICAL FIELD

The present invention relates to a shackle used to connect a heavy object and a lifting device in a process of transporting a heavy object.

BACKGROUND ART

In general, shackles are used as connecting members for connecting lifting devices, such as cranes that lift heavy objects, and heavy objects in a process of transporting the heavy objects. One side of the shackle is connected to a rope or chain of the lifting device, and the other side of the shackle is connected to a connection part of the heavy object.

In an example of the conventional shackle, a shackle body is formed in a U shape and connected to a rope or chain of a lifting device and a shackle pin is screw-coupled to one end portion of the shackle body while passing through both end portions of the shackle body and a connection part of the heavy object inserted between the both end portions of the shackle body.

In the shackle, an operator rotates the shackle pin in a fastening direction to fasten the shackle pin to the shackle body, and rotates the shackle pin in an unfastening direction to release the shackle pin from the shackle body. Accordingly, there are problems that the process of fastening the shackle pin to the shackle body or unfastening the shackle pin from the shackle body is cumbersome and excessive time is required in a process of transporting the heavy object which is frequently connected to or separated from the shackle. In addition, a case in which the shackle pin is released from the shackle body due to slight vibrations transmitted to the shackle through the rope or chain of the lifting device may occur to threaten safety.

In this regard, there is a technique as disclosed in Korean Registered Patent Publication No. 10-1705891 (published on Feb. 13, 2017).

Technical Problem

The present invention is directed to providing a safety shackle in which fastening and unfastening processes are performed conveniently and quickly and safety is improved.

Technical Solution

A safety shackle according to the present invention for achieving the objectives includes a shackle body, a shackle pin, and a first safety hook mechanism. The shackle body is formed in a shape in which a central body portion is bent so that first and second body end portions face each other and are spaced apart from each other, a first through hole is formed in the first body end portion, a second through hole, which is concentric with the first through hole, is formed in the second body end portion, and a first hook mounting hole vertically passing through the first through hole is formed in the first body end portion. In the shackle pin, a central pin portion blocks a space between the first and second body end portions in a state in which a first pin end portion is inserted into the first through hole and a second pin end portion is inserted into the second through hole, and a locking groove is formed along an outer circumference of the first pin end portion. The first safety hook mechanism includes a pair of first safety hooks having first fixing latches which are inserted into or separated from the locking groove of the first pin end portion positioned in the first through hole as first hook bodies are coupled to the first body end portion by first hinge shafts and rotated in a state in which the first safety hooks are symmetrical with each other and partially inserted into a first hook mounting hole, and a first safety hook spring which is disposed between the first safety hooks and applies an elastic force to the first safety hooks in directions in which the first fixing latches are inserted into the locking groove.

Advantageous Effects

According to a safety shackle of the present invention, since a shackle pin can be automatically and safely fixed to a shackle body when the shackle pin is fastened to the shackle body, and the shackle pin can be conveniently and quickly released from the shackle body, convenience and safety can be improved.

MODES OF THE INVENTION

Figure 1:
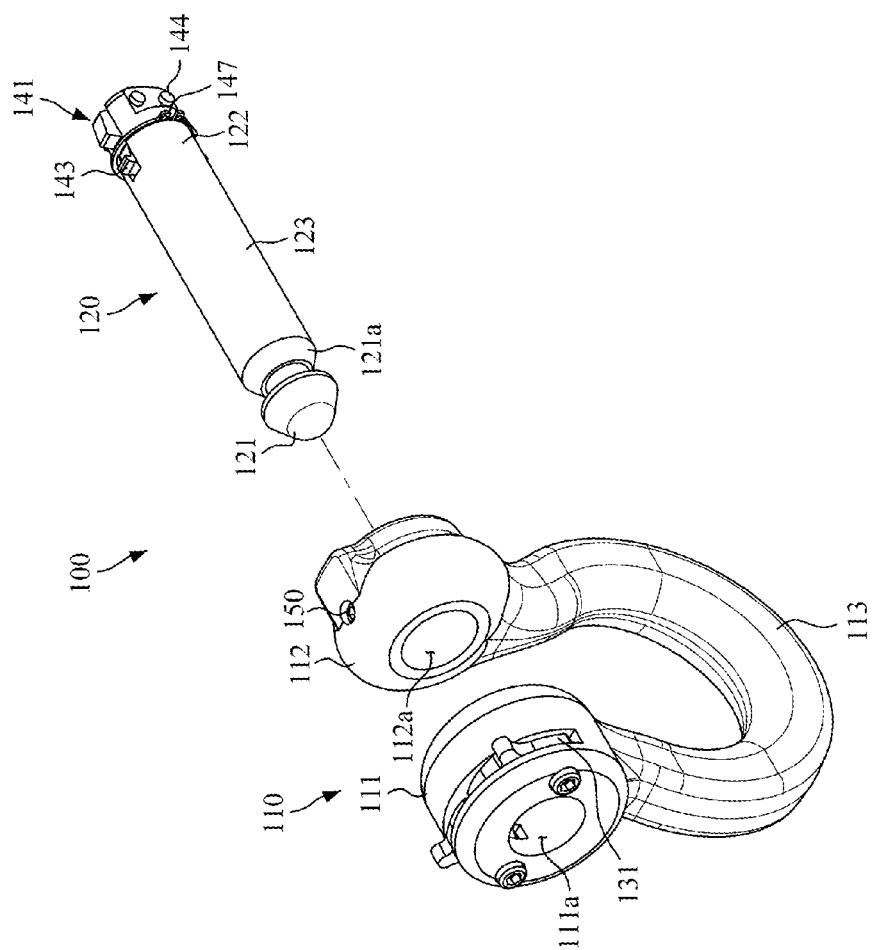
FIG. 1 is a perspective view illustrating a safety shackle according to one embodiment of the present invention.

Hereinafter, the present invention will be described in detail with reference to the accompanying drawings. Here, like reference numerals denote like elements, and repeated descriptions and detailed descriptions of known functions and configurations that may unnecessarily obscure the gist of the present invention will be omitted.

Embodiments of the present invention are provided in order to fully explain the present invention to those skilled in the art. Therefore, shapes and sizes of the elements in the drawings may be exaggerated for clearer description.

Figure 2:
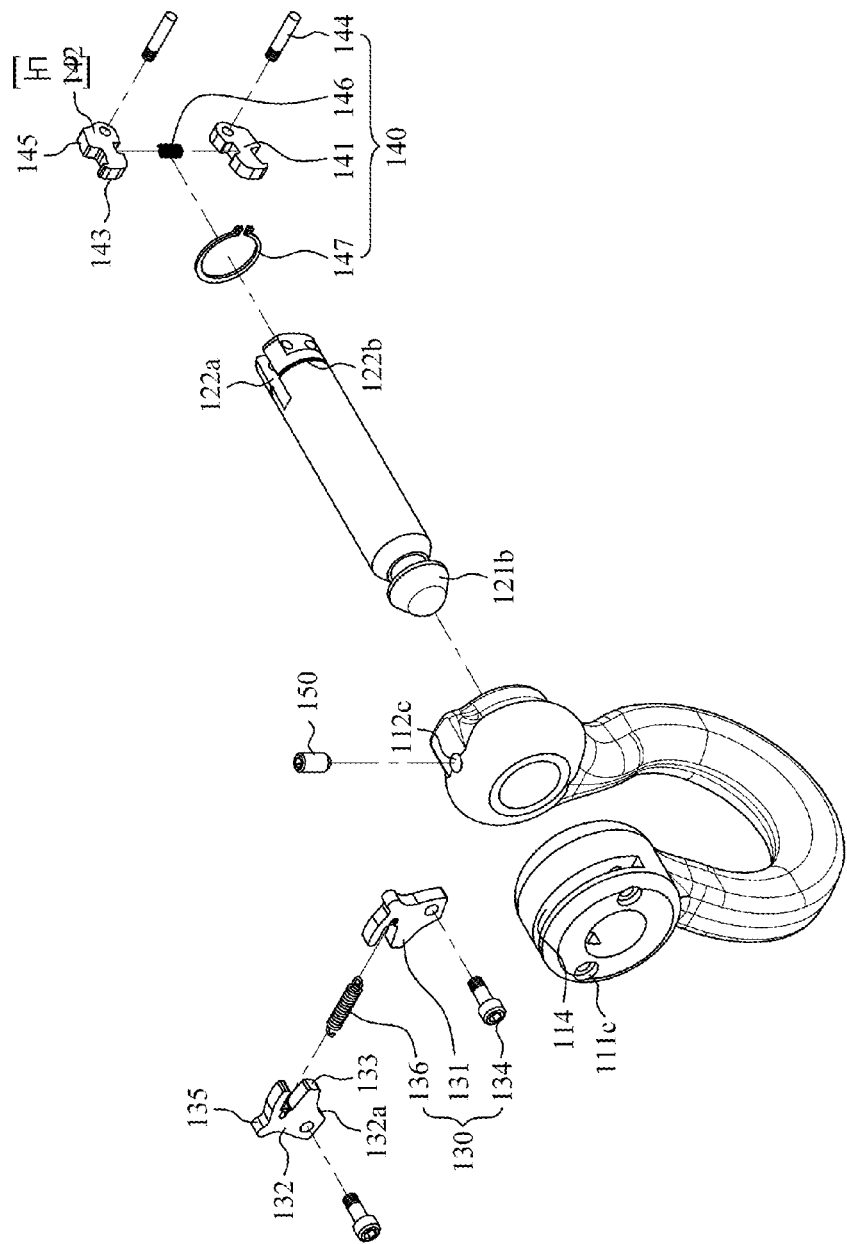
FIG. 2 is an exploded perspective view illustrating the safety shackle of FIG. 1.
Figure 3:
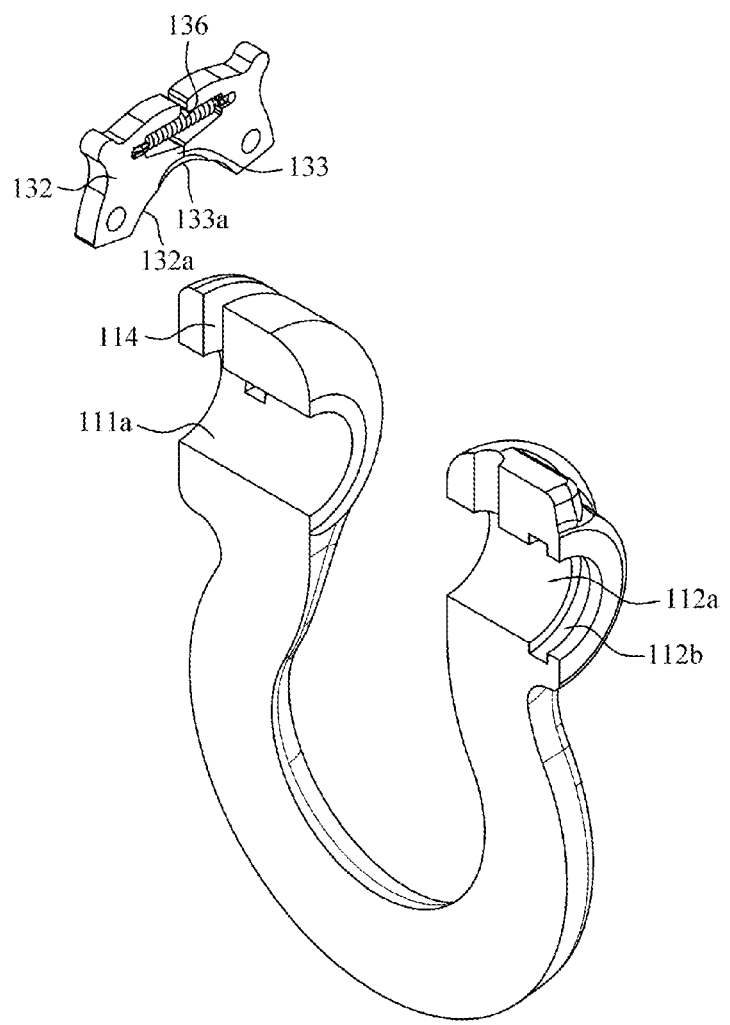
FIG. 3 is a perspective view illustrating a cross section of a shackle body of FIG. 2.
Figure 4:
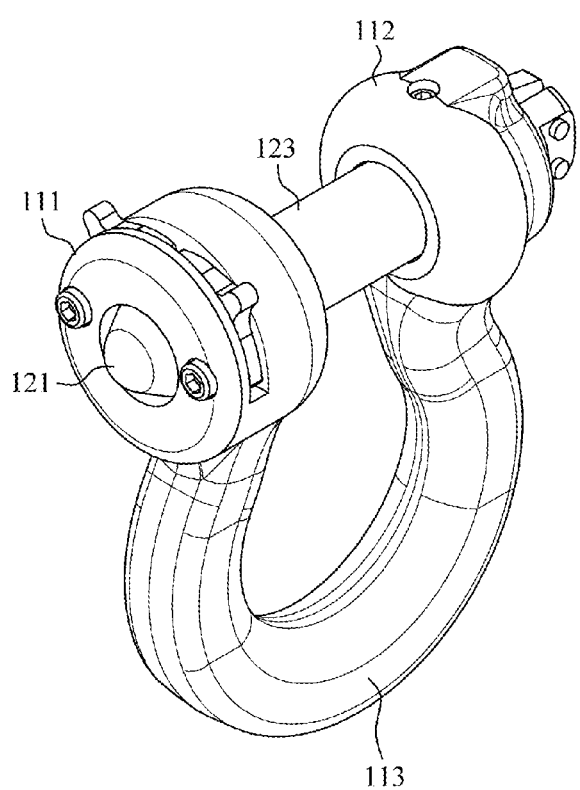
FIG. 4 is a perspective view illustrating a state in which a shackle pin is fastened to the shackle body of FIG. 1.
Figure 5:
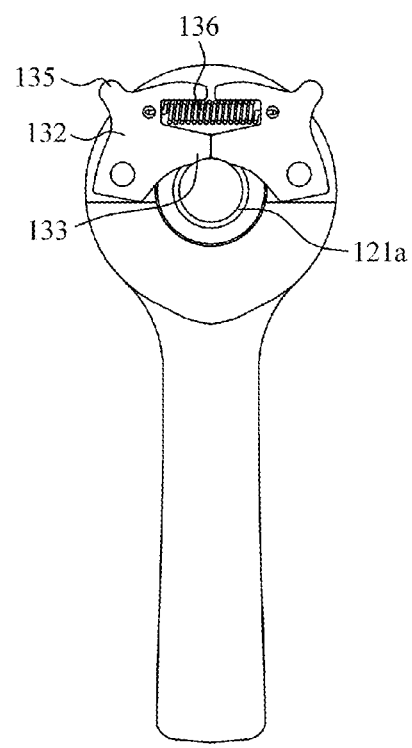
FIG. 5 is a cross-sectional view illustrating the state of FIG. 4.
Figure 6:
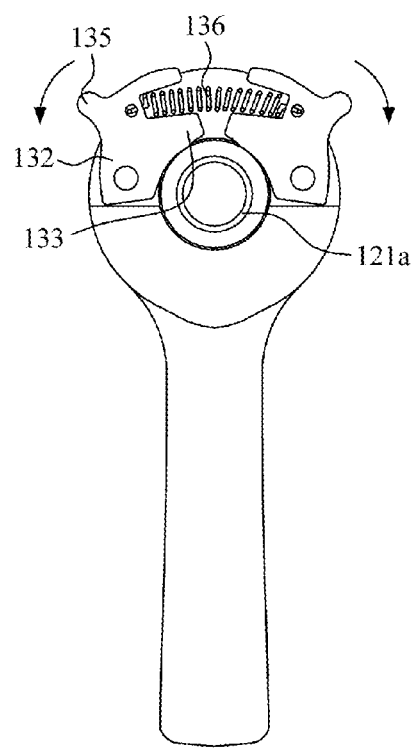
FIG. 6 is a cross-sectional view for describing a process of unfastening a first safety hook mechanism of FIG. 5.
Figure 7:
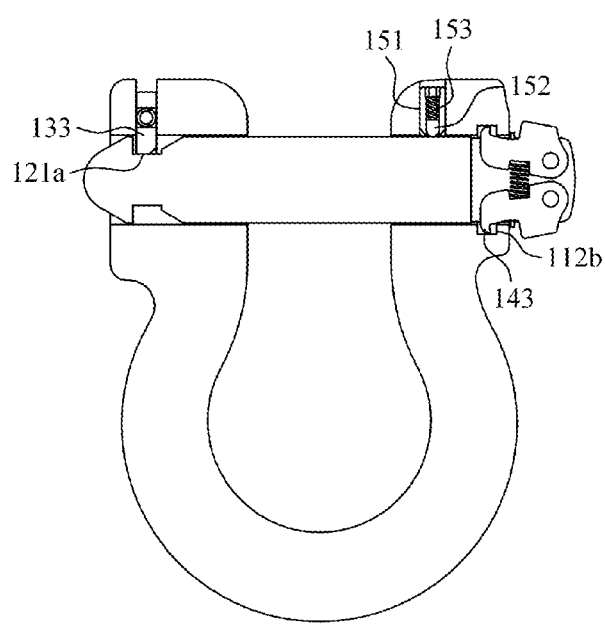
FIGS. 7 and 8 are cross-sectional views for describing locking and unlocking processes of a second safety hook mechanism of FIG. 4.
Figure 8:
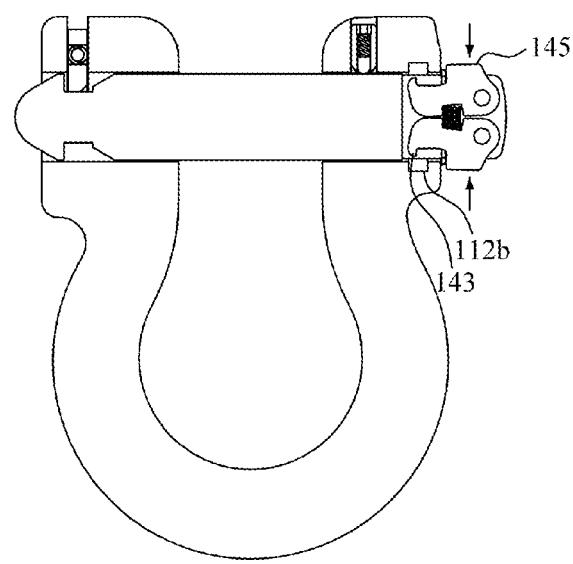
Figure 9:
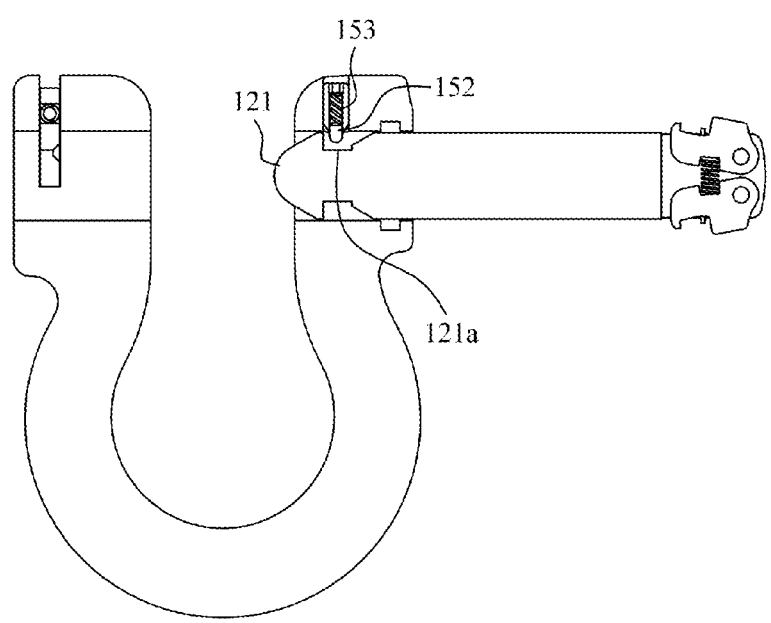
FIG. 9 is a cross-sectional view for describing an action of a separation prevention mechanism of FIG. 7.

Referring to FIGS. 1 to 9, a safety shackle 100 according to one embodiment of the present invention includes a shackle body 110, a shackle pin 120, and a first safety hook mechanism 130.

The shackle body 110 is formed in a shape, for example, a U shape in which a central body portion 113 is bent so that first and second body end portions 111 and 112 face each other and are spaced apart from each other. The shackle body 110 allows a rope or chain of a lifting device to be inserted into a space, which is formed by bending the central body portion 113 in the U shape, and connected to the shackle body 110.

In the shackle body 110, a first through hole 11a is formed in the first body end portion 111, and a second through hole 112a is formed in the second body end portion 112 to be concentric with the first through hole 11a. The shackle pin 120 is inserted into the first and second through holes 11a and 112a and supported by the shackle body 110. Each of the first and second through holes 11a and 112a may have a circular cross section. The first body end portion 111 may be formed in a shape extending outward in a longitudinal direction of the first through hole 111a, and the second body end portion 112 may be formed in a shape extending outward in a longitudinal direction of the second through hole 112a.

In the shackle body 110, a first hook mounting hole 114 perpendicularly passing through the first through hole 11a is formed in the first body end portion 111. The first hook mounting hole 114 allows the first safety hook mechanism 130 to be mounted.

The first hook mounting hole 114 may be formed in an outer extending portion of the first body end portion 111. The first hook mounting hole 114 may be formed to vertically pass through the first through hole 111a from an upper side of an outer extending portion of the first body end portion 111 based on the upward position of the first body end portion 111. The first hook mounting hole 114 may be formed to have a constant cross-sectional area along half of an outer circumference of the first body end portion 111.

In the shackle pin 120, a central pin portion 123 blocks the space between the first and second body end portions 111 and 112 in a state in which the first pin end portion 121 is inserted into the first through hole 111a and the second pin end portion 122 is inserted into the second through hole 112a. In the shackle pin 120, the second pin end portion 122 may be inserted into the second through hole 112a in a state in which the first pin end portion 121 is inserted into the first through hole 111a after passing through the second through hole 112a.

After the rope or chain of the lifting device is inserted into the bent space of the shackle body 110, the shackle pin 120 passes through the first and second body end portions 111 and 112 of the shackle body 110 and a connection part of a heavy object which is fitted between the first and second body end portions 111 and 112 and is fastened to the shackle body 110. Accordingly, the shackle pin 120 is connected to the connection part of the heavy object and blocks the space between the first and second body end portions 111 and 112 of the shackle body 110 to prevent separation of the rope or chain.

The shackle pin 120 may have a circular cross section. In the shackle pin 120, a locking groove 121a is formed along an outer circumference of the first pin end portion 121. The locking groove 121a is concavely formed to have a constant cross-sectional area along the outer circumference of the first pin end portion 121. The locking groove 121a interacts with first fixing latches 133 of the first safety hook mechanism 130 to lock or unlock the first pin end portion 121 of the shackle pin 120 to or from the first body end portion 111 of the shackle body 110.

The first safety hook mechanism 130 includes a pair of first safety hooks 131 and a first safety hook spring 136. In a state in which the first safety hooks 131 are symmetrical to each other and partially inserted into the first hook mounting hole 114, as first hook bodies 132 are coupled to the first body end portion 111 by first hinge shafts 134 and rotated, the first fixing latches 133 are inserted into or separated from the locking groove 121a of the first pin end portion 121 positioned in the first through hole 111a.

Each of the first fixing latches 133 may have an inclined surface 133a formed at a portion facing the first pin end portion 121 and inclined in a direction away from the first pin end portion 121. Accordingly, the first fixing latch 133 may smoothly move into the first hook mounting hole 114 while the inclined surface 133a comes into contact with and is pushed by the approaching first pin end portion 121.

The inclined surface 133a of the first fixing latch 133 allows the shackle pin 120 to be smoothly fastened to the shackle body 110. That is, the first fixing latch 133 may be pushed and rotated by the inclined surface 133a when coming into contact with the first pin end portion 121, withdrawn from the first through hole 111a, and then seated in the locking groove 121a by an elastic force of the first safety hook spring 136.

Meanwhile, an opposite portion of the inclined surface 133a of the first fixing latch 133 may be perpendicular to a longitudinal direction of the first pin end portion 121.

The first pin end portion 121 may an inclined surface 121b toward the first fixing latch 133 at a portion coming into contact with the first fixing latch 133. For example, the first pin end portion 121 may have the inclined surface 121b toward the inclined surface 133a of the first fixing latch 133 at the portion coming into contact with the inclined surface 133a of the first fixing latch 133. The first pin end portion 121 may have the inclined surface 121b formed in a shape in which an outer diameter gradually decreases from an outer circumferential side of the locking groove 121a, which is close to an end portion, to the end portion.

The inclined surface 121b of the first pin end portion 121 has the same angle as the inclined surface 133a of the first fixing latch 133. Accordingly, a contact surface between the inclined surface 121b of the first pin end portion 121 and the inclined surface 133a of the first fixing latch 133 increases, and thus the first fixing latch 133 can more smoothly move into the first hook mounting hole 114.

In the locking groove 121a, an inner wall close to the first fixing latch 133 may have a right angle with respect to a bottom surface, and an inner wall far from the first fixing latch 133 may be inclined toward the central pin portion 123 with respect to the bottom surface. In the locking groove 121a, the inner wall having the right angle is in surface contact with an outer wall of the first fixing latch 133 facing the inner wall, the inclined inner wall is in surface contact with the inclined surface 133a of the first fixing latch 133 facing the inclined inner wall, and thus the first fixing latch 133 can be more stably restrained.

The first hook body 132 may have a predetermined thickness. In the first hook bodies 132, inner end portions close to the bottom of the first hook mounting hole 114 may be coupled to the first body end portion 111 by the first hinge shafts 134. The first hinge shafts 134 may be disposed parallel to a longitudinal direction of the shackle pin 120 to rotatably support the first hook bodies 132 with respect to the first body end portion 111. The first body end portion 111 has shaft holes 111c for mounting the first hinge shafts 134.

Each of the first hinge shafts 134 may have a head at one end and a threaded part at the other end. The head of the first hinge shaft 134 is formed in a hexagonal shape and may be fastened or unfastened by a user's finger or an Allen wrench. The first hinge shaft 134 may be formed in a shape in which the threaded part is omitted in a center portion.

In the first hinge shaft 134, in a state in which the portion, in which the threaded part is omitted, is inserted into a shaft hole of the first hook body 132, the threaded part is screw-coupled to the first body end portion 111, and thus the first hinge shaft 134 can smoothly support rotation of the first safety hook 131 while preventing separation of the first safety hook 131.

The first hook body 132 may include the first fixing latch 133 in an inner portion, which faces the first through hole 111a and is an outer end portion far from the first hinge shaft 134. The first hook body 132 may include a through groove 132a concavely formed along an inner portion from the first fixing latch 133 so that the first fixing latch 133 passes through the first pin end portion 121 while the first fixing latch 133 is withdrawn from the first through hole 111a.

The first hook bodies 132 may include operating pieces 135 protruding from outer portions thereof. The first hook bodies 132 may separate the first fixing latches 133 from the locking groove 121a as the operating pieces 135 are being pushed outward from the first hook mounting hole 114 by a user. The user may separate the operating pieces 135 of the first safety hooks 131 from the locking groove 121a by separating the first fixing latches 133 by pulling or pushing the operating pieces 135 to be spaced apart from each other using the user's fingers.

The first safety hook spring 136 is disposed between the first safety hooks 131 to apply an elastic force to the first safety hooks 131 in directions in which the first fixing latches 133 are inserted into the locking groove 121a. The first safety hook spring 136 may be formed of a tension coil spring and may be mounted between outer end portions of the first hook bodies 132.

In the first hook bodies 132, mounting grooves may be formed at outer portions which are disposed outside the first hinge shafts 134 to face each other. Both ends of the first safety hook spring 136 may be inserted into and supported by the mounting grooves of the first hook body 132.

The first safety hook spring 136 maintains a state in which the first fixing latches 133 are withdrawn from the first through hole 111a through an elastic force. The first safety hook spring 136 is elastically deformed when an external force is applied to the first fixing latches 133 to withdraw the first fixing latches 133 from the first through hole 111a, and then, when the external force applied to the first fixing latches 133 is removed, the first fixing latch 133 can return to an original position by an elastic restoring force.

The first safety hook mechanism 130 may act as follows. When the user fastens the shackle pin 120 to the shackle body 110, the first fixing latches 133, which have entered the first through hole 111a, are pushed into the first hook mounting hole 114 by the first pin end portion 121 of the shackle pin 120. Accordingly, the first safety hook spring 136 is elastically deformed.

Then, when the locking groove 121a of the first pin end portion 121 corresponds to the first fixing latches 133, the first safety hook spring 136 allows the first fixing latches 133 to enter the locking groove 121a through an elastic restoring force. Accordingly, when the user simply inserts the first pin end portion 121 of the shackle pin 120 into the first body end portion 111 of the shackle body 110, the first fixing latches 133 are automatically inserted into the locking groove 121a to lock the first pin end portion 121 to the first body end portion 111.

In addition, when the user pulls or pushes the operating pieces 135 of the first safety hooks 131 to the outside of the first hook mounting hole 114 so that the operating pieces 135 move away from each other, the first safety hook spring 136 may be elastically deformed to separate the first fixing latches 133 from the locking groove 121a, and thus the first pin end portion 121 can be released from the first body end portion 111. Accordingly, the first pin end portion 121 can be conveniently locked to or unlocked from the first body end portion 111.

In an additional aspect, the second body end portion 112 may include a fixing groove 112b formed along an inner circumference of the second through hole 112a. The fixing groove 112b is concavely formed along the inner circumference of the second through hole 112a to have a constant cross-sectional area. The fixing groove 112b interacts with second fixing latches 143 of a second safety hook mechanism 140 so that the second pin end portion 122 of the shackle pin 120 may be fixed to or released from the second body end portion 112 of the shackle body 110.

The second pin end portion 122 may include a second hook mounting groove 122a cut from an end portion so that both sides of a side surface are open, and a ring mounting groove 122b formed along an outer circumference. The second hook mounting groove 122a is formed to have a constant cross-sectional area in a longitudinal direction of the second pin end portion 122. The ring mounting groove 122b is concavely formed along the outer circumference of the second pin end portion 122 to have a constant cross-sectional area. The second hook mounting groove 122a and the ring mounting groove 122b allow the second safety hook mechanism 140 to be mounted.

The second safety hook mechanism 140 may include a pair of second safety hooks 141, a second safety hook spring 146, and a snap ring 147. In a state in which the pair of second safety hooks 141 are symmetrical to each other and partially inserted into the second hook mounting groove 122a, as second hook bodies 142 are coupled to the second pin end portion 122 by second hinge shafts 144 and rotated, the second fixing latches 143 are inserted into or separated from the fixing groove 112b.

Each of the second hook bodies 142 may have a predetermined thickness. The second hook bodies 142 are rotatably coupled to the second pin end portion 122 by the second hinge shafts 144 in a state in which outer end portions close to an end portion of the second pin end portion 122 are disposed in the second hook mounting groove 122a. The second hinge shafts 144 may be disposed perpendicular to the longitudinal direction of the shackle pin 120 to rotatably support the second hook bodies 142.

Each of the second hinge shafts 144 may be formed in a shape in which a threaded part is formed on one portion and a threaded part is omitted from the remaining portion. In the second hinge shaft 144, the threaded part may be screw-coupled to the second pin end portion 122 in a state in which the portion, in which the threaded part is omitted, is inserted into a shaft hole of the second hook body 142, and thus the second hinge shaft 144 can smoothly support rotation of the second safety hook 141 while preventing separation of the second safety hook 141.

The second hook body 142 includes a second fixing latch 143 at an inner end portion far from an end portion of the second pin end portion 122. The second fixing latch 143 is integrally formed with the second hook body 142 to have the same thickness as the second hook body 142. The second hook body 142 may be formed in a shape in which an inner end portion is convexly curved. Accordingly, when the second pin end portion 122 is inserted into the second through hole 112a of the second body end portion 112, the convexly curved inner end portion of the second hook body 142 may come into contact with an outer circumferential side of the second through hole 112a and smoothly enter the second hook mounting groove 122a.

Accordingly, the second fixing latch 143 may enter the second through hole 112a in a state in which the second fixing latch 143 enters the second hook mounting groove 122a and may then be inserted into the fixing groove 112b. The second through hole 112a is formed in a shape which is expanded while being convexly curved from the outer circumferential side, and thus the second hook body 142 may more smoothly enter the second hook mounting groove 122a.

The second hook body 142 may include a pressing piece 145 protruding in a shape extending from an outer end portion toward the outside of the second hook mounting groove 122a. The pressing piece 145 may be pressed by the user to rotate the second hook body 142 to the second hook mounting groove 122a so as to separate the second fixing latch 143 from the fixing groove 112b.

The second safety hook spring 146 is disposed between the second safety hooks 141 to apply an elastic force to the second safety hooks 141 in directions in which the second fixing latches 143 are inserted into the fixing groove 112b. The second safety hook spring 146 may be formed of a compression coil spring. In the second hook bodies 142, mounting grooves may be formed at portions which deviate inward from the second hinge shafts 144 and face each other. Both end portions of the second safety hook spring 146 may be inserted into and supported by the mounting grooves of the second hook body 142, respectively.

The second safety hook spring 146 maintains a state in which the second fixing latches 143 are withdrawn from the second hook mounting groove 122a through an elastic force. When the second fixing latches 143 receive an external force and enter the second hook mounting groove 122a, the second safety hook spring 146 is elastically deformed, and then when the external force applied to the second fixing latches 143 is removed, the second fixing latches 143 can return to an original position through an elastic restoring force.

The snap ring 147 is inserted into the ring mounting groove 122b in a state of surrounding both of the second hook bodies 142 to prevent separation of the second safety hooks 141 and the second safety hook spring 146. The snap ring 147 is formed in a shape in which one portion is cut and inserted into the ring mounting groove 122b.

The second safety hook mechanism 140 may act as follows. When the user fastens the shackle pin 120 to the shackle body 110, the second fixing latches 143, which have been withdrawn from the second hook mounting groove 122a of the second pin end portion 122, enter the second hook mounting groove 122a as an inner end portion of the second hook bodies 142 come into contact with the outer circumferential side of the second through hole 112a and rotate. Accordingly, the second safety hook spring 146 is elastically deformed.

Then, when the second fixing latches 143 enter the second through hole 112a and correspond to the fixing groove 112b, the second safety hook spring 146 allows the second fixing latches 143 to enter the fixing groove 112b through an elastic restoring force. Accordingly, when the user simply inserts the second pin end portion 122 of the shackle pin 120 into the second body end portion 112 of the shackle body 110, the second fixing latches 143 are automatically inserted into the fixing groove 112b, and thus the second pin end portion 122 can be fixed to the second body end portion 112.

In addition, when the user simultaneously presses the pressing pieces 145 with his/her fingers to rotate the second hook bodies 142 to be close to each other, the second safety hook spring 146 is elastically deformed to separate the second fixing latches 143 from the fixing groove 112b, and thus the second pin end portion 122 can be released from the second body end portion 112. Accordingly, the second pin end portion 122 can be conveniently fixed to or released from the second body end portion 112.

Meanwhile, the second safety hook mechanism 140 may not mounted in the second pin end portion 122 of the shackle pin 120, and instead of the second safety hook mechanism 140, the first safety hook mechanism 130 may be mounted in the second body end portion 112 of the shackle body 110. In this case, the second pin end portion 122 has the locking groove 121a of the first pin end portion 121. The second pin end portion 122 may be formed in a shape symmetrical with the first pin end portion 121. The second body end portion 112 has the first hook mounting hole 114 of the first body end portion 111. The second body end portion 112 may be formed in a shape symmetrical with the first body end portion 111.

In an additional aspect, the second body end portion 112 may include a housing mounting hole 112c which vertically passes through the second through hole 112a. The housing mounting hole 112c allows a separation prevention mechanism 150 to be mounted.

The separation prevention mechanism 150 may include a housing 151, a nose 152, and a nose spring 153. The housing 151 is formed in a shape which has an inner space and of which one end is open and the other end is closed. The housing 151 is mounted in the housing mounting hole 112c in a state in which one opening faces the second through hole 112a. The housing 151 may be screw-coupled to the housing mounting hole 112c. In the case, a female thread may be formed in the housing mounting hole 112c, and a male thread may be formed on an outer circumferential surface of the housing 151 to be coupled to the female thread of the housing mounting hole 112c.

As the nose 152 enters or exits through the opening of the housing 151, the nose 152 is inserted into or withdrawn from the locking groove 121a positioned in the second through hole 112a. The nose 152 may be formed in a shape in which an outer end facing the second through hole 112a is convexly curved to minimize a contact portion with the shackle pin 120. An inner end of the nose 152 positioned in the housing 151 is caught on a circumferential side of the opening of the housing 151, and thus separation of the nose 152 can be prevented.

The nose spring 153 is accommodated in the housing 151 and applies an elastic force to the nose 152 in a direction in which the nose 152 is withdrawn from the housing 151. The nose spring 153 may be formed of a compression coil spring. In the housing 151, both ends of the nose spring 153 may be supported by a bottom surface of the housing 151 and an inner end of the nose 152.

The separation prevention mechanism 150 may act as follows. When the user fastens the shackle pin 120 to the shackle body 110, the nose 152, which has entered the second through hole 112a, is pushed into the housing 151 and enters the housing by an outer surface of the shackle pin 120. Accordingly, the nose spring 153 is elastically deformed.

Then, when the shackle pin 120 is released from the shackle body 110 and the locking groove 121a of the first pin end portion 121 corresponds to the nose 152, the nose spring 153 allows the nose 152 to enter the locking groove 121a through an elastic restoring force. Accordingly, the shackle pin 120 is not completely released from the shackle body 110 because the first pin end portion 121 is hooked due to the locking groove 121a and the nose 152. Accordingly, the separation of the shackle pin 120 can be prevented and the convenience of fastening of the shackle pin 120 can be improved.

Meanwhile, when the shackle pin 120 is to be completely released from the shackle body 110, the separation prevention mechanism 150 is partially withdrawn outward from the housing mounting hole 112c to withdraw the nose 152 from the locking groove 121a so that the first pin end portion 121 may be completely separated from the second through hole 112a. In the separation prevention mechanism 150, when the housing 151 is screw-coupled to the housing mounting hole 112c, an operator may unfasten the screw-coupling to partially withdraw the housing 151 outward from the housing mounting hole 112c.

An example of an action of the safety shackle 100 of the above-described embodiment will be described as follows.

The user fastens the shackle pin 120 to the shackle body 110. Then, the first pin end portion 121 is inserted into the first through hole 111a of the first body end portion 111 after passing through the second through hole 112a of the second body end portion 112. In this case, the first fixing latches 133 of the first safety hooks 131 enter the first through hole 111a due to the first safety hook spring 136, and then are pushed into the first hook mounting hole 114 by the first pin end portion 121. Then, when the locking groove 121a of the first pin end portion 121 corresponds to the first fixing latches 133, the first fixing latches 133 enter the locking groove 121a due to an elastic restoring force of the first safety hook spring 136 to lock the first pin end portion 121 to the first body end portion 111.

Meanwhile, the second pin end portion 122 is inserted into the second through hole 112a of the second body end portion 112. In this case, the second fixing latches 143 of the second safety hooks 141 are withdrawn from the second hook mounting groove 122a of the second pin end portion 122 by the second safety hook spring 146, and then enter the second hook mounting groove 122a as an inner end portion of the second hook body 142 comes into contact with the outer circumferential side of the second through hole 112a and rotates. Then, when the second fixing latches 143 enter the second through hole 112a and correspond to the fixing groove 112b, the second fixing latches 143 enter the fixing groove 112b due to an elastic restoring force of the second safety hook spring 146 so that the second pin end portion 122 is fixed to the second body end portion 112.

In this state, in order to release the shackle pin 120 from the shackle body 110, the user pulls or pushes the operating pieces 135 of the first safety hooks 131 with his/her fingers to spread the operating pieces 135 apart and presses the pressing pieces 145 of the second safety hooks 141 with his/her fingers to close the pressing pieces 145. Then, the first fixing latches 133 are separated from the locking groove 121a due to elastic deformation of the first safety hook spring 136, and the second fixing latches 143 are separated from the fixing groove 112b due to elastic deformation of the second safety hook spring 146. Then, the user withdraws and releases the first and second pin end portions 121 and 122 from the first and second body end portions 111 and 112.

Then, the user moves the first pin end portion 121 to the second through hole 112a of the second body end portion 112 to open the space between the first and second body end portions 111 and 112. In this case, the nose 152 of the separation prevention mechanism 150, which has been pushed by the shackle pin 120 and withdrawn from the second through hole 112a, corresponds to the locking groove 121a of the first pin end portion 121. Then, the nose 152 enters the locking groove 121a by the elastic restoring force of the nose spring 153. Accordingly, the shackle pin 120 may wait to be fastened again in a state in which the first pin end portion 121 is not completely released from the shackle body 110.

As described above, in the safety shackle 100 of the present embodiment, when the shackle pin 120 is fastened to the shackle body 110, since the shackle pin 120 can be automatically and safely fixed to the shackle body 110 and conveniently and quickly released therefrom, convenience and safety can be improved.

In addition, in the safety shackle 100 of the present embodiment, even when one of the first safety hooks 131 of the first safety hook mechanism 130 is released, safety can be secured, and even when one of the second safety hooks 141 of the second safety hook 140 is released, safety can be secured. Accordingly, in the safety shackle 100 of the present embodiment, since each of the first and second safety hook mechanisms 130 and 140 can secure two-fold safety, as a result, four-fold safety can be secured.

The present invention has been described with reference to embodiments illustrated in the accompanying drawings, but the embodiments are merely exemplary. It will be understood by those skilled in the art that various modifications and equivalent other embodiments are possible. Therefore, the scope of the present invention is defined by the appended claims.

The invention claimed is:

1. A safety shackle comprising:
   a shackle body formed in a shape in which a central body portion is bent so that a first body end portion and a second body end portion face each other and are spaced apart from each other, wherein a first through hole is formed in the first body end portion, a second through hole is formed in the second body end portion to be concentric with the first through hole, and a first hook mounting hole perpendicularly passing through the first through hole is formed in the first body end portion;
   a shackle pin in which a central pin portion blocks a space between the first body end portion and the second body end portion in a state in which a first pin end portion is inserted into the first through hole and a second pin end portion is inserted into the second through hole and a locking groove is formed along an outer circumference of the first pin end portion; and
   a first hook mechanism including a pair of first safety hooks and a first safety hook spring, wherein first fixing latches of the first safety hooks are inserted into or separated from the locking groove of the first pin end portion positioned in the first through hole as first hook bodies of the first safety hooks are coupled to the first body end portion by first hinge shafts and rotated in a state in which the first safety hooks are symmetrical with each other and partially inserted into the first hook mounting hole, and the first safety hook spring is disposed between the first safety hooks and applies an elastic force to the first safety hooks in directions in which the first fixing latches are inserted into the locking groove; wherein:
   each of the first hook bodies has an inner end portion which is adjacent to a bottom of the first hook mounting hole and is coupled to the first body end portion by the first hinge shaft and includes the first fixing latch at an outer end portion of an inner portion which faces the first through hole and is far from the first hinge shaft, a through groove concavely formed along an inner portion from the first fixing latch so that the first pin end portion passes through in a state in which the first fixing latch is withdrawn from the first through hole, and an operating piece protruding from an outer portion; and the first safety hook spring is formed of a tension coil spring and mounted between outer end portions of the first hook bodies.

2. The safety shackle of claim 1, wherein the first fixing latch has an inclined surface formed at a portion facing the first pin end portion and inclined in a direction away from the first pin end portion.

3. The safety shackle of claim 1, wherein the first pin end portion has an inclined surface formed at a portion which comes into contact with the first fixing latch and inclined toward the first fixing latch.

4. The safety shackle of claim 1, wherein:
the second body end portion includes a fixing groove formed along an inner circumference of the second through hole;
the second pin end portion includes a second hook mounting groove cut from an end portion so that both sides of a side surface are open and a ring mounting groove formed along an outer circumference; and
the safety shackle includes:
a second safety hook mechanism having a pair of second safety hooks in which second fixing latches are inserted into or separated from the fixing groove as second hook bodies are coupled to the second pin end portion by second hinge shafts and rotated in a state in which the second safety hooks are symmetrical with each other and partially inserted into the second hook mounting groove;
a second safety hook spring which is disposed between the second safety hooks and applies an elastic force to the second safety hooks in directions in which the second fixing latches are inserted into the fixing groove; and
a snap ring which is inserted into the ring mounting groove in a state in which the snap ring surrounds both of the second hook bodies and prevents separation of the second safety hooks and the second safety hook spring.

5. A safety shackle comprising:
a shackle body formed in a shape in which a central body portion is bent so that a first body end portion and a second body end portion face each other and are spaced apart from each other, wherein a first through hole is formed in the first body end portion, a second through hole is formed in the second body end portion to be concentric with the first through hole, and a first hook mounting hole perpendicularly passing through the first through hole is formed in the first body end portion;
a shackle pin in which a central pin portion blocks a space between the first body end portion and the second body end portion in a state in which a first pin end portion is inserted into the first through hole and a second pin end portion is inserted into the second through hole and a locking groove is formed along an outer circumference of the first pin end portion; and a first hook mechanism including a pair of first safety hooks and a first safety hook spring, wherein first fixing latches of the first safety hooks are inserted into or separated from the locking groove of the first pin end portion positioned in the first through hole as first hook bodies of the first safety hooks are coupled to the first body end portion by first hinge shafts and rotated in a state in which the first safety hooks are symmetrical with each other and partially inserted into the first hook mounting hole, and the first safety hook spring is disposed between the first safety hooks and applies an elastic force to the first safety hooks in directions in which the first fixing latches are inserted into the locking groove; wherein:
the second body end portion includes a fixing groove formed along an inner circumference of the second through hole;
the second pin end portion includes a second hook mounting groove cut from an end portion so that both sides of a side surface are open and a ring mounting groove formed along an outer circumference; and
the safety shackle includes:
a second safety hook mechanism having a pair of second safety hooks in which second fixing latches are inserted into or separated from the fixing groove as second hook bodies are coupled to the second pin end portion by second hinge shafts and rotated in a state in which the second safety hooks are symmetrical with each other and partially inserted into the second hook mounting groove;
a second safety hook spring which is disposed between the second safety hooks and applies an elastic force to the second safety hooks in directions in which the second fixing latches are inserted into the fixing groove; and
a snap ring which is inserted into the ring mounting groove in a state in which the snap ring surrounds both of the second hook bodies and prevents separation of the second safety hooks and the second safety hook spring.

6. The safety shackle of claim 5, wherein:
each of the first hook bodies has an inner end portion which is close to a bottom of the first hook mounting hole and is coupled to the first body end portion by the first hinge shaft and includes the first fixing latch at an outer end portion of an inner portion which faces the first through hole and is far from the first hinge shaft, a through groove concavely formed along an inner portion from the first fixing latch so that the first pin end portion passes through in a state in which the first fixing latch is withdrawn from the first through hole, and an operating piece protruding from an outer portion; and
the first safety hook spring is formed of a tension coil spring and mounted between outer end portions of the first hook bodies.

7. The safety shackle of claim 5, wherein the first fixing latch has an inclined surface formed at a portion facing the first pin end portion and inclined in a direction away from the first pin end portion.

8. The safety shackle of claim 5, wherein the first pin end portion has an inclined surface formed at a portion which comes into contact with the first fixing latch and inclined toward the first fixing latch.

* * * * *